United States Patent [19]

Yamagishi et al.

[11] Patent Number: 4,984,136
[45] Date of Patent: Jan. 8, 1991

[54] AUTOMOTIVE HEADLAMP UNIT WITH AIMING ADJUSTMENT LID

[75] Inventors: Hirofumi Yamagishi, Isehara; Shigenobu Ohtsuka; Youichi Kikuchi, both of Yokohama; Takayuki Isobe, Hiratsuka; Masato Mochizuki, Isehara, all of Japan

[73] Assignees: Nissan Motor Co., Ltd., Yokohama; Ichikoh Industries, Ltd., Tokyo, both of Japan

[21] Appl. No.: 424,741

[22] Filed: Oct. 20, 1989

[30] Foreign Application Priority Data

Oct. 20, 1988 [JP] Japan ................. 63-136108

[51] Int. Cl.⁵ ............................. B60Q 1/02
[52] U.S. Cl. ........................ 362/66; 362/80; 362/428; 33/365
[58] Field of Search ............ 362/61, 66, 80, 287, 362/428; 33/335, 365, 379, 354, 370

[56] References Cited

U.S. PATENT DOCUMENTS

| | | | |
|---|---|---|---|
| 1,609,634 | 12/1926 | Ryan | 33/370 |
| 2,058,743 | 10/1936 | Trippe | 362/311 |
| 3,612,854 | 10/1971 | Todd et al. | 362/268 |
| 4,660,128 | 4/1987 | Bergin et al. | 362/80 |
| 4,794,495 | 12/1988 | McMahan et al. | 362/66 |
| 4,802,067 | 1/1989 | Ryder et al. | 362/61 |

*Primary Examiner*—Ira S. Lazarus
*Assistant Examiner*—Richard R. Cole
*Attorney, Agent, or Firm*—Foley & Lardner, Schwartz, Jeffery, Schwaab, Mack, Blumenthal & Evans

[57] ABSTRACT

The automotive headlamp unit having a lamp housing formed integrally with a front lens and in which a reflector and a lamp bulb as a light source are provided is provided with an aiming adjustment device including pivot mechanisms to tilt the lamp housing about horizontal and vertical axis, respectively, in relation to the body of a car, and also the lamp housing has provided therein an aiming adjustment aid composed of a level vial supported tiltably in the vertical plane parallel to the optical axis of the reflector and a manual operating member to adjust the tilt angle of the level vial. At the headlamp unit manufacturer, the posture of the lamp housing with respect to the car body is pre-adjusted by means of the aiming adjustment device to obtain an optimum luminous intensity distribution pattern, and in this adjusted condition, the level vial is tilted in the vertical plane parallel to the optical axis by means of the manual operating member until the bubble in the level vial comes to the reference position at the center of the level vial. This condition is held. This tilt angle of the lamp housing corresponding to the optimum orientation of the optical axis with respect to the plane of the ground is easily reproduced, and so the aiming adjustment of the headlamp unit can be very easily done at the automobile manufacturer or car repair/maintenance shop.

4 Claims, 1 Drawing Sheet

AUTOMOTIVE HEADLAMP UNIT WITH AIMING ADJUSTMENT LID

BACKGROUND OF THE INVENTION (a) Field of the Invention

The present invention relates to an automotive headlamp unit with an aiming device, and more particularly to an automotive headlamp unit provided with a simple device for providing an easy and accurate aiming adjustment of the optical axis with respect to the plane of the ground without the necessity of using any special device such as an aimer, aiming screen or the like at a car repair/maintenance shop as well as at the automobile production line.

(b) Description of the Prior Art

It is important with automotive headlamp units to properly adjust the orientation of the optical axis. If the optical axis is directed excessively upward, the light from the headlamp will dazzle the driver of a car running in the opposite lane. On the contrary, if the optical axis is orientated excessively downward, the relatively far area in front of the car cannot be sufficiently illuminated. So, various rules and regulations are imposed upon the headlamp units for optimum alignment of the optical axis from the standpoint of safe driving.

The optical axis is usually aligned after the headlamp units are installed on the body of a car. The optical-axis orientating device provided in an automotive headlamp unit of such a type as has a lamp housing receiving a reflector and a front lens, the lamp housing and front lens being formed integrally with each other, and which is intended to align the optical axis or adjust the luminous intensity distribution pattern consisting of pivot mechanisms which support, for example, the lamp housing pivotably in relation to the car body and two adjusting screws which turn the lamp housing vertically (about the horizontal axis) and horizontally (about the vertical axis), respectively. For inspecting, if the optical axis is properly orientated so that the rays of light emitted frontwardly from the headlamp units form an optimum luminous intensity distribution pattern, an aimer is used. The inspection of the optical axis alignment using such aimer needs three index protrusions, that is, aiming bosses, provided on the outer surface of the front lens and which aid to mount the aimer in a correct position. Such aiming bosses esthetically spoil the appearance of the front lens, and it is difficult with such inspection using the aimer to accurately check if the optical axis of a headlamp unit of which the front lens is disposed as slanted with an angle of less than 90 degrees with respect to the optical axis, so-called a slant-type headlamp, is properly orientated.

Furthermore, the car service centers and car repair/maintenance shops of middle or small scale must bear expenses for new equipment since an inspection device such as an aimer is necessary when they are requested by a client to replace a damaged headlamp with a new one.

SUMMARY OF THE INVENTION

The present invention has an object to provide an automotive headlamp unit provided with a simple device for providing an easy and accurate aiming adjustment of the optical axis with respect to the plane of the ground without esthetically spoiling the appearance of the front lens and also without the necessity of taking in consideration the inclination of the outer surface of the front lens with respect to the optical axis.

The present invention has another object to provide an automotive headlamp unit provided with a simple device for providing an easy and accurate aiming adjustment of the optical axis with respect to the plane of the ground without the necessity of using any special device such as an aimer, aiming screen or the like at a car repair/maintenance shop as well as in the automobile production line.

The above object of the present invention is attained by providing an automotive headlamp unit comprising a reflector having an apex and optical axis, a lamp bulb as a light source disposed nearly on the optical axis of the reflector, a lamp housing receiving the reflector and which is to be fixed to the body of a car, a front lens covering the front opening of the reflector and fixed to the lamp housing, and adjusters including pivot mechanisms supporting the lamp housing pivotably in relation to the car body and which tilt the lamp housing about the horizontal and vertical axes, respectively, the lamp housing being provided with an aiming adjustment aid composed of a level vial tiltably supported within the vertical surface parallel to the optical axis and a manual operating member which adjusts the tilt angle of the level vial.

At a factory in which such automotive headlamp units are produced, the lamp housing is held in such a posture as fixed to the body of a car, and in this condition, the orientation of the optical axis with respect to the plane of the ground is pre-adjusted by tilting the lamp housing about the horizontal and vertical axes, respectively, by means of the adjusters so that an optimum luminous intensity distribution pattern is obtained. Keeping this adjusted condition, the manual operating member is operated to tilt the level vial gradually in the vertical plane parallel to the optical axis until the bubble in the level vial comes to the reference position at the center of the vial. Thus, the tilt angle of the lamp housing corresponding to the optimum orientation of the optical axis with respect to the horizontal axis is easily produced. After these adjustments, the automotive headlamp units will be shipped to the automobile manufacturers and car repair/maintenance shops. At the automobile manufacturer, the headlamp units are installed to the car body at the assembling line and the optical axis is orientated. Since the optical axis has already been aligned for the optimum orientation at the automotive headlamp unit manufacturer's factory and the tilt angle of the lamp housing is indexed by the position of the bubble in the level vial, the aiming adjustment can be done easily and accurately. This is also true in the car repair/maintenance shop.

DETAILED DESCRIPTION OF THE PREFERRED EMBODIMENT

Figure 1:
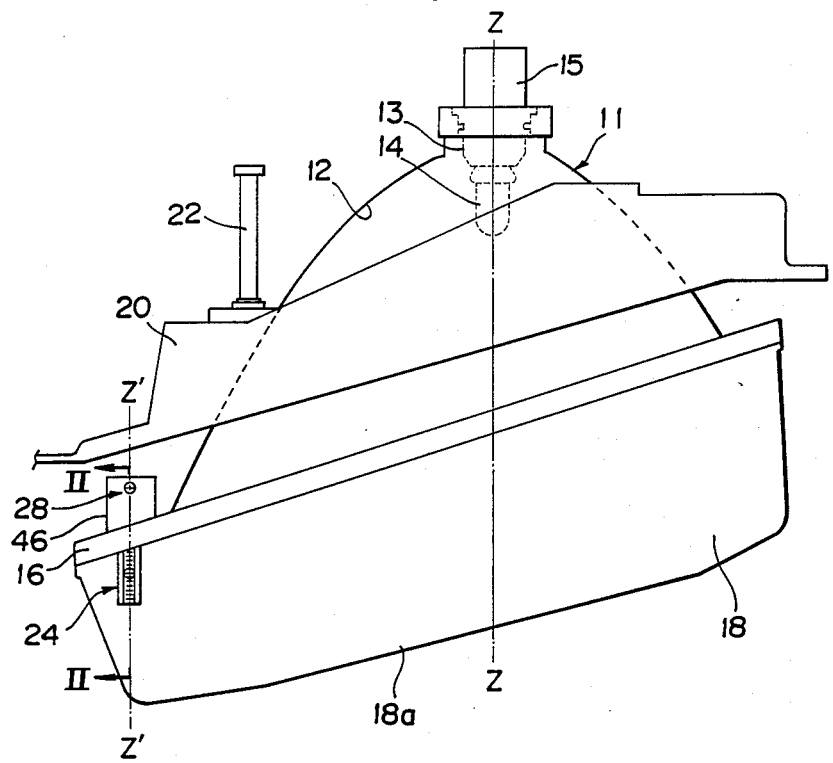
FIG. 1 is a schematic plan view showing one embodiment of the automotive headlamp unit according to the present invention.
Figure 2:
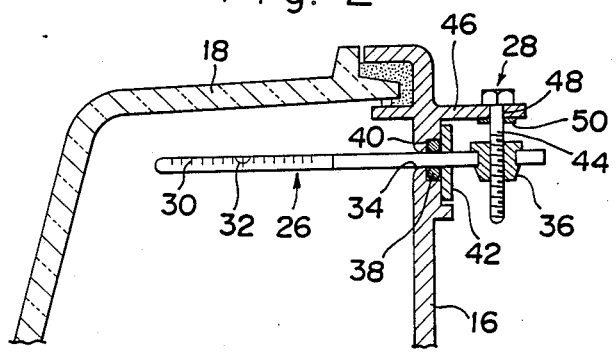
FIG. 2 is a partially fragmentary sectional view, enlarged in scale, taken along the line II—II of FIG. 1.

One embodiment of the automotive headlamp unit according to the present invention will be described in detail with reference to the drawings. In FIG. 1, the reference numeral 11 indicates a lamp housing with which a reflector 12 is formed integrally. The reflector 12 has an apex opening 13 in which a lamp holder 15 having fixed therein a lamp bulb 14 as a light source is installed. The center of the filament of the lamp bulb 14 is positioned on the optical axis Z—Z of the reflector 12. According to this embodiment, the inner reflecting surface of the reflector 12 is a paraboloid of revolution, and the center of the filament is positioned near the focus of the paraboloid of revolution. There is formed on the circumferential edge of the front opening of the lamp housing 11 a flange 16 on which a front lens 18 is to be mounted. The front lens 18 is disposed covering the front opening of the lamp housing 11 and has an outer front surface 18a formed as slanted with respect to the optical axis Z—Z. The front lens 18 has formed on the inner front surface thereof a plurality of prisms (not shown) intended to refract the rays of light reflected nearly in parallel with the optical axis Z—Z by the reflector 12 so as to provide a luminous intensity distribution pattern of a predetermined shape in front of the car. The lamp housing 11 fixed with the front lens 18 covering the front opening of the reflector 12 is pivotably supported on a base member 20 which is to be installed to the body of a car, and its tilting about the horizontal and vertical axes is adjustable by adjusting screws 22, respectively. Only one adjusting screw is shown in FIG. 1, but actually two adjusting screws are provided rotatably in relation to the lamp housing 11 but axially immobile. Each of these adjusting screws 22 is screwed in a nut member (not shown) made of a synthetic resin and which is fixed to the base member 20. The adjusters including such pivot mechanisms and two adjusting screws are known per se, and so will not be described any further.

The reference numeral 24 indicates a device provided on the lamp housing and which aids the aiming adjustment. The device is composed of a level vial 26 supported tiltably in the vertical plane (indicated with Z'—Z') parallel to the optical axis Z—Z and a manual operating member 28 to adjust the tilt angle of the level vial 26. The level vial 26 is so disposed that its scale 30 and bubble 32 are within the lamp housing 11, and also the front lens 18 is transparent at a part of the outer circumference thereof so that the scale 30 and bubble 32 of the level vial 26 are visible from outside. The level vial 26 is extended at one end thereof through an opening 34 formed in the flange 16 to outside of the lamp housing 11, and has fixed at the end thereof a nut member 36 made of a synthetic resin and which forms a part of the manual operating member 28. There is formed in the rear end face of the flange 16 in a position corresponding to the opening 34 a groove 40 for receiving an O-ring 38. The O-ring 38 is held by a retainer 42 from outside to support an extended portion of the level vial 26 and also prevent water from entering into the lamp housing 11. The retainer 42 is fixed on the rear end face of the flange 16 with screws (not shown). The nut member 36 has screwed therein an adjusting screw 44 forming a part of the manual operating member 28. The adjusting screw 44 is disposed generally vertically passing through an opening 48 formed in a bracket 46 formed integrally with the flange 16. The adjusting screw 44 is supported rotatably in relation to the bracket 46 but inhibited by a snap ring 50 from moving vertically. The manual operating member 28 thus consists of the nut member 36 and adjusting screw 44. Namely, as the adjusting screw is rotated, the synthetic resin-made nut member 36 screwed thereon is moved nearly vertically. Actually, the nut member 36 can be moved as slightly deformed because of the synthetic resin's elasticity. So, the level vial 26 will be tilted about the contact with the O-ring 38 in the vertical plane indicated with Z'—Z'.

The optical axis of the automotive headlamp unit according to the present invention is orientated as in the following. First, at the headlamp unit manufacturer, the posture of the lamp housing 11 with respect to the base member 20, namely, the orientation of the optical axis, is adjusted before the head-lamp unit is shipped to the automobile manufacturer or repair/maintenance shop. The base member 20 is installed to a test stand corresponding to the body of a car to which the headlamp unit is to be installed in practice. Then, the two adjusting screws 22 are appropriately rotated until an optimum luminous intensity distribution pattern is obtained. As the screws are rotated, the lamp housing 11 is tilted about the horizontal and vertical axes and the optimum posture of the lamp housing 11 with respect to the base member 20 can be held. In this condition, the adjusting screws are rotated to tilt the level vial 26 about the contact with the O-ring 38 in the vertical plane indicated with Z'—Z' until the center of the bubble 32 in the level vial 26 coincides with the reference line of the scale 30. The tilted position of the level vial 26 thus adjusted always corresponds to the plane of the ground, and so the inclination of the optical axis with respect to the plane of the ground can be easily reproduced. The headlamp unit thus pre-adjusted is shipped to the automobile manufacturer or car repair/maintenance shop where it will be installed to the body of car. For reproduction of the optimum posture of the lamp housing 11 with respect to the plane of the ground, the two adjusting screws 22 are rotated to make the center of the bubble 32 in the level vial 26 coincide with the reference line of the scale 30 for fine adjustment of the posture of the lamp housing 11 with respect to the base member 20.

Therefore, the device 24 for aiding the aiming adjustment of the automotive headlamp unit unnecessitates the use of the conventional aimer or the like as a device to inspect if the optical axis is optimally orientated and also makes very easy the optical axis alignment at the automobile manufacturers or car repair/maintenance shops. Furthermore, since there is no necessity of forming on the outer surface of the front lens three aiming bosses which provide an indices for installing the aimer in correct positions as in the conventional optical-axis inspection, the appearance of the headlamp unit is not spoiled and it is not necessary to consider the inclination of the outer surface of the front lens with respect to the optical axis. So it will be obvious to those skilled in the art that the present invention has a great advantage when applied to a slant-type headlamp unit.

In the embodiment having been described in the foregoing, the device 24 for reproduction of the optimum posture of the lamp housing 11 with respect to the plane of the ground is composed of the level vial 26 tiltably supported in the vertical plane (indicated with Z'—Z') parallel to the optical axis Z—Z and the manual operating member 28 which adjusts the tilt angle of the level vial 26, but there is not provided any device for reproduction of the optimum posture of the lamp housing 11 with respect to the vertical plane. Similarly to the device 24, however, a device consisting of a level vial supported tiltably in the vertical plane perpendicular to the optical axis Z—Z and a manual operating member which adjusts the tilt angle of the level vial may of course be provided for reproducing the optimum posture of the lamp housing 11 with respect to the vertical plane.

What is claimed is:

1. An automotive headlamp unit for a body of a car, comprising:
    a reflector having a front opening, an apex and an optical axis;
    a lamp bulb as a light source disposed proximate the optical axis of said reflector;
    a lamp housing receiving said reflector and which is to be fixed to the body of a car;
    a front lens covering the front opening of said reflector and fixed to said lamp housing; and
    adjusters including pivot mechanisms supporting said lamp housing pivotably in relation to the car body and which tilt said lamp housing about a horizontal axis and a vertical axis, respectively;
    said lamp housing being provided with an aiming adjustment aid composed of a level vial tiltably supported inside a vertical surface of the lamp housing parallel to the optical axis and a manual operating member which adjusts the tilt angle of the level vial; and
    wherein said level vial is disposed within said lamp housing and so arranged that the scale on said level vial can be read from outside said lamp housing.

2. An automotive headlamp unit for a body of a car, comprising:
    a reflector having a front opening, an apex and an optical axis;
    a lamp bulb as a light source disposed proximate the optical axis of said reflector;
    a lamp housing receiving said reflector and which is to be fixed to the body of the car;
    a front lens covering the front opening of said reflector and fixed to said lamp housing; and
    adjusters including pivot mechanisms supporting said lamp housing pivotably in relation to the car body and which tilt said lamp housing about a horizontal axis and a vertical axis respectively;
    said lamp housing being provided with an aiming adjustment aid composed of a level vial tiltably supported inside a vertical surface of the lamp housing parallel to the optical axis and a manual operating member which adjusts the tilt angle of the level vial, and
    wherein said level vial has a protruded end which is partially extended passing loosely through an opening formed in said lamp housing to outside said lamp housing, the protruded end of said level vial being connected with the manual operating member which tilts the level vial nearly about said opening and holds the level vial in a predetermined position.

3. An automotive headlamp unit according to claim 2, wherein said manual operating member comprises a synthetic resin-made nut member fixed to said protruded end, and an adjusting screw member screwed in said nut member and which is supported rotatably in relation to said lamp housing and not axially movably.

4. An automotive headlamp unit according to claim 3, wherein said adjusting screw member is so designed as to be manually rotatable from above said lamp housing.

* * * * *